(12) United States Patent
Freeman et al.

(10) Patent No.: US 7,435,444 B2
(45) Date of Patent: Oct. 14, 2008

(54) CONTROL OF PRE-CURED PRODUCT MOISTURE FOR FORMALDEHYDE-FREE FIBERGLASS PRODUCTS

(75) Inventors: Charles John Freeman, Littleton, CO (US); Mark William Charbonneau, Littleton, CO (US); Richard Thomas Packard, Elbert, CO (US)

(73) Assignee: Johns Manville, Denver, CO (US)

( * ) Notice: Subject to any disclaimer, the term of this patent is extended or adjusted under 35 U.S.C. 154(b) by 699 days.

(21) Appl. No.: 10/897,804

(22) Filed: Jul. 23, 2004

(65) Prior Publication Data

US 2006/0019024 A1 Jan. 26, 2006

(51) Int. Cl.
*B05D 3/00* (2006.01)
(52) U.S. Cl. ........................................ 427/8; 427/389.8
(58) Field of Classification Search ...................... 427/8, 427/389.8
See application file for complete search history.

(56) References Cited

U.S. PATENT DOCUMENTS 4,203,155 A * 5/1980 Garst ........................ 700/122
5,826,458 A * 10/1998 Little ............................. 73/73
6,331,350 B1 * 12/2001 Taylor et al. ................. 428/221
6,565,914 B2 * 5/2003 Madaras et al. ................. 427/8

* cited by examiner

*Primary Examiner*—Erma Cameron
(74) *Attorney, Agent, or Firm*—Robert D. Touslee

(57) ABSTRACT

A system for controlling the residual moisture in pre-cured binder coated glass fibers. The moisture of the binder coated glass fibers is measured after the process water is extracted in a collection box. Based on the level of moisture found in the coated glass fibers, adjustments are made to the process upstream of the moisture measurements. The adjustments include, but are not limited to, adjusting the amount of water used to make the binder composition; adjusting the amount of heat applied to the binder composition as it is applied to the glass fibers and adjusting the vacuum conditions used to extract the process water from the binder coated glass fibers. Control of the residual moisture in the precured binder coated glass fibers helps ensure proper curing of the binder during the subsequent curing step.

4 Claims, 1 Drawing Sheet

CONTROL OF PRE-CURED PRODUCT MOISTURE FOR FORMALDEHYDE-FREE FIBERGLASS PRODUCTS

TECHNICAL FIELD

The present invention relates to a method for controlling the pre-cured moisture in glass fibers coated with novel, formaldehyde-free binders. Controlling the moisture content of the pre-cured products ensures proper curing of the binder composition. Control is achieved.

BACKGROUND OF THE INVENTION

Fiberglass binders have a variety of uses ranging from stiffening applications where the binder is applied to woven or non-woven fiberglass sheet goods and cured, producing a stiffer product; thermo-forming applications wherein the binder resin is applied to sheet or lofty fibrous product following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize the majority to all of the water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins, e.g. resorcinol/formaldehyde resins, are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet characteristics so as to form a rigid thermoset polymeric mat for the glass fibers when cured. A low binder viscosity in the uncured state is required to allow the mat to be sized correctly. Also, viscous binders tend to be tacky or sticky and hence they lead to accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its specified vertical dimension when installed in a building.

From among the many thermosetting polymers, numerous candidates for suitable thermosetting fiber-glass binder resins exist. However, binder-coated fiberglass products are often of the commodity type, and thus cost becomes a driving factor, generally ruling out such resins as thermosetting polyurethanes, epoxies, and others. Due to their excellent cost/performance ratio, the resins of choice in the past have been phenol/formaldehyde resins. Phenol/formaldehyde resins can be economically produced, and can be extended with urea prior to use as a binder in many applications. Such urea-extended phenol/formaldehyde binders have been the mainstay of the fiberglass insulation industry for years.

Over the past several decades, however, minimization of volatile organic compound emissions (VOCs) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol/formaldehyde resole resins, changes in catalysts, and addition of different and multiple formaldehyde scavengers, has resulted in considerable improvement in emissions from phenol/formaldehyde binders as compared with the binders previously used. However, with increasing stringent Federal regulations, more and more attention has been paid to alternative binder systems which are free from formaldehyde.

One particularly useful formaldehyde-free binder system employs a binder comprising a polycarboxy polymer and a polyol. Formaldehyde-free resins are those which are not made with formaldehyde or formaldehyde-generating compounds. Formaldehyde-free resins do not emit appreciable levels of formaldehyde during the insulation manufacturing process and do not emit formaldehyde under normal service conditions. Use of this binder system in conjunction with a catalyst, such as an alkaline metal salt of a phosphorous-containing organic acid, results in glass fiber products that exhibit excellent recovery and rigidity properties.

While the binder compositions result in final products which have properties equal to or superior to those made with traditional binders, the compositions also present technical challenges. One such challenge is controlling the moisture of the product as it enters the curing oven. It has been found that if the residual moisture of the product entering into the curing oven exceeds 20 percent by weight of the product, uneven curing results which can detrimentally affect the performance of the product.

While it is possible to control the final moisture content of the uncured product by adjusting the amount of water introduced into the system. When the binder composition is formed, this system has been found to be inadequate. The system fails to take into account such factors as environmental humidity, temperature and the flow in the collection box, and the like. In addition, it has been found that the use of a high water content binder composition, improves the application of the binder to the fiber. Thus, it may, in fact, be desirable to start with a high water content binder composition yet have a perceived product with a relatively low moisture.

It is desirable to have a real time monitoring system that continuously monitors the moisture content of the pre-cured product. This information is then fed into a control system that is capable of adjusting one or more upstream variables to control the pre-cured product moisture.

BRIEF SUMMARY OF THE INVENTION

Control of residual moisture in pre-cured fiberglass products using a formaldehyde-free binder is achieved by monitoring the residual moisture before the product enters the curing oven; comparing the measured residual moisture to a pre-determined value and, if the measured moisture exceeds the pre-set values, adjusting one or more upstream process conditions to reduce the residual water content in the pre-cured product.

Moisture content can be measured by a number of known techniques. Preferred are indirect methods such as spectroscopic techniques. Of these, radiofrequency (e.g., microwave) and near infrared methods are preferred with near infrared most preferred. The moisture values can range from 0 to over 20 % weight percent (wt %) with at least about 4 weight percent (wt %) preferred.

The process conditions which can be adjusted are any condition which affects the residual moisture in the pre-cured product. Among the conditions that can affect residual moisture include the amount of process water added to the binder resin to form the binder composition; heating the binder coated glass fibers in the collection box; and the flow of air through the fibers in the collector box. Other process conditions that can be adjusted are well-known to those skilled in the art.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
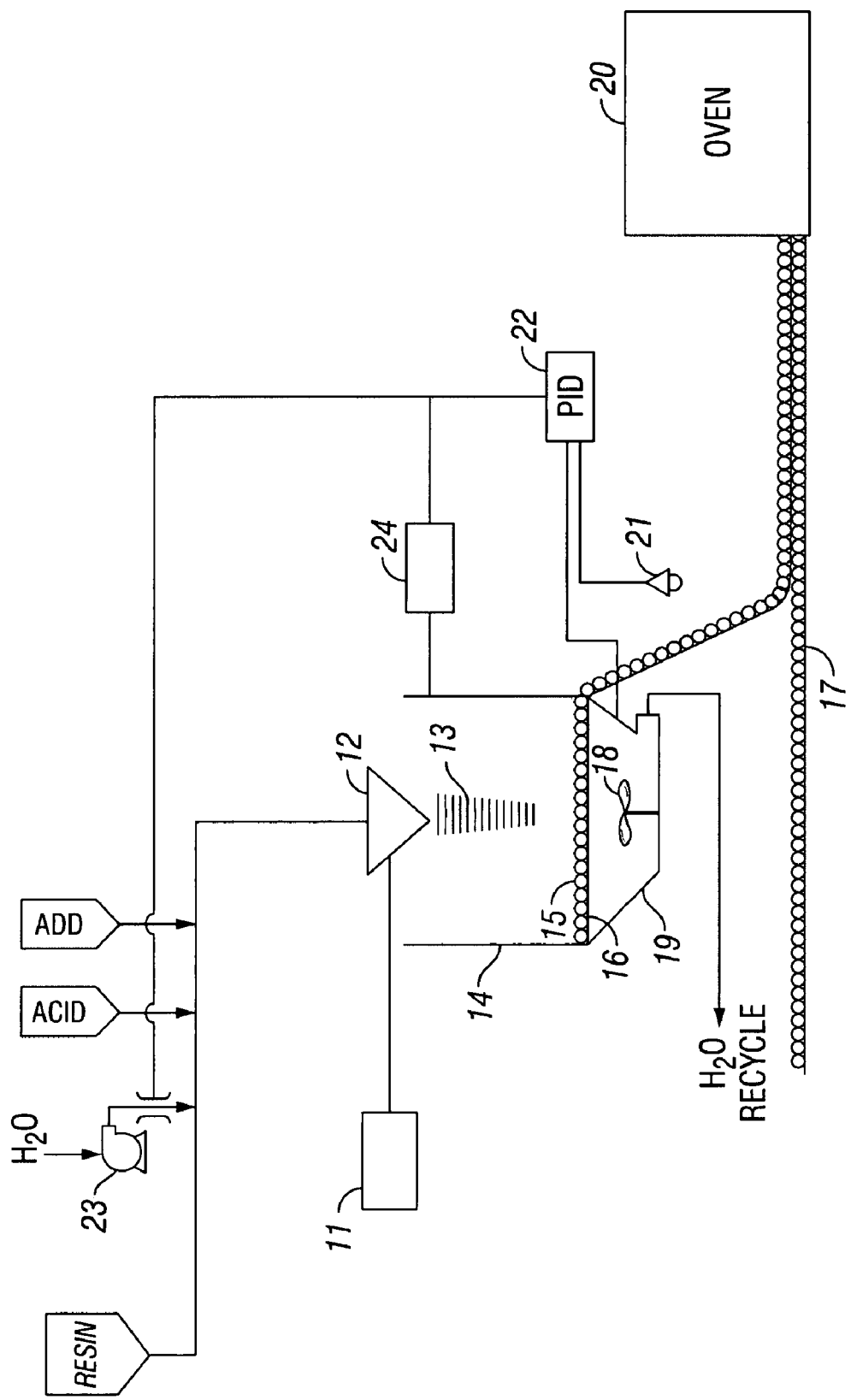
FIG. 1 is a schematic of the moisture control system of the invention.

Fiberglass products having a formaldehyde-free binder system are prepared by first preparing a mixture of binder resin and process water. As used herein, the term formaldehyde-free refers to a reservoir composition that is substantially free of formaldehyde and/or does not liberate substantial amounts of formaldehyde as a result of curing or drying. The binder resin itself contains between 45 and 53 % polymer solids with the balance being water. When the binder composition is prepared for use, resin is then further diluted with water to yield a suitable binder composition. Acid is then added to the mixture to reduce the pH to about 3.5 or less. Other additives may be added to the mixture. The net result is a composition with significant amounts of water. While the water is helpful in ensuring proper application of the binder to the glass fiber, significant amounts of water can adversely affect curing.

If significant amounts of water are present in the uncured product, a significant amount of heat is used to evaporate the water and not for curing the product. If the product is not heated to a significantly higher temperature for a minimum period of time, the product will not be properly cured, thus resulting in inferior performance. While some curing ovens can tolerate moisture contents of up to 20 wt % based on total product weight, many ovens can only tolerate moistures as low as about 5 wt %.

Conversely, it has been found that the presence of a higher level of moisture at pre-cure yields improved product performance after curing. This is especially true for fiberglass products made with formaldehyde-free binders. Thus, while it had been previously thought that pre-cured moisture should be kept to a minimum, it has now been learned that moisture levels of at least about 4 wt % produce finished products with improved properties. Thus it is desirable to ensure that the product moisture has a minimum moisture level sufficient to ensure that optimal finished product properties are achieved while not exceeding the capacity of the curing ovens to effectively remove the moisture and cure the binder. The minimal moisture amounts needed to achieve the desired properties will generally range from at least about 4 wt % to upward of 20 wt % or more. The actual values needed to achieve the desired results will depend on such factors as, but not limited to, the nature of the binder used and the capacity of the curing ovens.

The invention is directed at a method of ensuring that the product that enters a curing oven has a moisture content less than the maximum amount the curing oven can tolerate and still produce an acceptable product. The method involves measuring the product moisture before it enters the curing oven and, depending upon the moisture value of the product, adjusting one or more process variables upstream of the curing oven.

The formaldehyde-free binders are typically poly-carboxy polymers such as acrylic resins although any formaldehyde-free resin useful as a fiberglass binder may be used. They generally have a molecular weight of less than about 10,000, preferably less than about 5,000, most preferably less than about 3,000 with about 2,000 being advantageous.

The polycarboxy polymer used in the binder of the present invention comprises an organic polymer or oligomer containing more than one pendant carboxy group. The polycarboxy polymer may be a homopolymer or copolymer prepared from unsaturated carboxylic acids including but not necessarily limited to, acrylic acid, methacrylic acid, crotonic acid, isocrotonic acid, maleic acid, cinnamic acid, 2-methylmaleic acid, itaconic acid, 2-methylitaeonic acid, alpha.,.beta.-methyleneglutaric acid, and the like. Alternative, the polycarboxy polymer may be prepared from unsaturated anhydrides including, but not necessarily limited to, maleic anhydride, methacrylic anhydride, and the like, as well as mixtures thereof. Methods for polymerizing these acids and anhydrides are well-known in the chemical art.

The formaldehyde-free curable aqueous binder composition of the present invention also contains a polyol containing at least two hydroxyl groups. The polyol must be sufficiently nonvolatile such that it will substantially remain available for reaction with the polyacid in the composition during heating and curing operations. The polyol may be a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, .beta.-hydroxyalkylamides such as, for example, bis[N,N-di(β-hydroxyethyl)]adipamide, as may be prepared according to the teachings of U.S. Pat. No. 4,076,917, hereby incorporated herein by reference, or it may be an addition polymer containing at least two hydroxyl groups such as, for example, polyvinyl alcohol, partially hydrolyzed polyvinyl acetate, and homopolymers or copolymers of hydroxyethylmethacrylate, hydroxypropylmethacrylate, and the like. The most preferred polyol for the purposes of the present invention is triethanolamine (TEA).

The ratio of the number of equivalents of carboxy, anhydride, or salts thereof of the polyacid to the number of equivalents of hydroxyl in the polyol is from about 1/0.01 to about 1/3. An excess of equivalents of carboxy, anhydride, or salts thereof of the polyacid to the equivalents of hydroxyl in the polyol is preferred. The more preferred ratio of the number of equivalents of carboxy, anhydride, or salts thereof in the polyacid to the number of equivalents of hydroxyl in the polyol is from about 1/0.4 to about 1/1. The most preferred ratio of the number of equivalents of carboxy, anhydride, or salts thereof in the polyacid to the number of equivalents of hydroxyl in the polyol is from about 1/0.6 to about 1/0.8, and most preferably from 1/0.65 to 1/0.75. A low ratio, approaching 0.7:1, has been found to be of particular advantage in the present invention, when combined with a low molecular weight polycarboxy polymer and the low pH binder.

The formaldehyde-free curable aqueous binder composition of the present invention also contains a catalyst. Most preferably, the catalyst is a phosphorous-containing accelerator which may be a compound with a molecular weight less than about 1000 such as, for example, an alkali metal polyphosphate, an alkali metal dihydrogen phosphate, a polyphosphoric acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing accelerator may be used at a level of from about 1 % to about 40 %, by weight based on the combined weight of the polyacid and the polyol. Preferred is a level of phosphorous-containing accelerator of from about 2.5 % to about 10 %, by weight based on the combined weight of the polyacid and the polyol.

As shown in FIG. 1, fiberglass products are formed in a multi-step process. Molten glass is introduced from a furnace 11 through a spinner 12 that forms a plurality of fiberglass fibers 13 in a method well known in the art. The formaldehyde-free binder composition is sprayed onto the fibers by a plurality of spaced nozzles to form an uncured binder coated fiber.

The coated fibers are then introduced into a collection box 14 that forms the fibers into an uncured pack or mat 15. The collection box 14 comprises a continuous moving belt or conveyor 16 that contains the uncured coated fibers 15 and moves them through the collection box to a second conveyor 17. The fibers are gathered onto the first conveyor 16 by pulling a large volume of air across a series of perforated plates on the conveyor 16 using one or more forming fans 18.

The fibers form an uncured pack 15 on the first conveyor 16. A drop out box 19 slows down the velocity of air between the conveyor 16 and the fans 18 so that water and other materials which pass through the first conveyor 16 do not reach the fan 18.

Much of the moisture in the product is removed in the collection box 14. A significant amount of moisture is removed by evaporation due to the heat from the molten fibers. Additional moisture is removed by the flow of air through the glass fibers during the forming process. The amount of heat in the collection box 14 as well as the rate of air flow in the box will affect the moisture present in the product as it leaves the collection box.

In practicing the invention, moisture sensors 20 are placed immediately downstream of the collection box 14 and prior to the entrance of the curing oven 21. The measured moisture value is then transmitted to a control unit 22 when the measured moisture value to compared with a pre-set moisture value. If the measured value exceeds the pre-set value, the control unit 22 then causes a change in one or more upstream process conditions thereby causing a reduction in the residual moisture.

As discussed above, the pre-set moisture values will depend on such factors as the nature of the binder system used, the desired properties of the finished product and the capacity of the curing ovens. Typically the present moisture values for formaldehyde-free binder based products will be at least about 0 wt % to over 20 wt % with at least about 4 wt % to about 20 wt % preferred. The upper moisture value is limited primarily by the capacity of the oven to remove the moisture while still effectively curing the binder and the lower limit is generally determined based on product performance criteria and the nature of the binder.

In one embodiment, the control unit 22 relays a signal to the pump 22 that supplies process water to the system. In the case where the moisture content is too high, the control unit 22 causes the pump 23 to decrease the flow of process water thereby decreasing the water content of the binder composition. This, in turn, results in less residual moisture in the product before it enters the curing oven 20. Care should be taken, however, to ensure that a minimum level of water is added to properly prepare the binder composition.

The moisture sensor 21 can be any moisture measurement system or device that can determine the percent of moisture present in the product. Preferred are indirect moisture sensors that do not interfere with the processing of the product and can provide continuous monitoring of moisture content. One particularly useful type sensor is the spectrographic sensor. These sensors measure moisture by exposing the sample to electromagnetic radiation at specific frequencies corresponding to characteristic absorptions of unbound water and measurement of either the absorbed or reflected reduction of the various spectroscopic techniques, microwave (MW) and Near Infrared (NIR) are preferred with NIR most preferred.

The control unit 22 can be any system, method or device that can compare the measured moisture value with a pre-set value and then cause or reduce changes in one or more process variable. Of these, automatic, electronic systems such as Proportional Integral Derivative (PID) devices are preferred.

In another embodiment, the moisture content is controlled by introducing additional heat into the collection box 14 to driving off the residual water. In this embodiment, when the sensor 21 detects a moisture value in excess of the pre-set value, the control unit 22 sends a signal to the heating unit 24 which increases the temperature in the control unit thereby driving off any residual moisture. Typically this temperature ranges from about 27° C. to about 205° C. with from about 65° C. to about 150° C. preferred that can be applied to the collection box in a number of methods the like. The additional heat can come from numerous sources including heating elements added to the collection box, hot air or water captured from other parts of the system and the like.

Yet another method for controlling the pre-cured product moisture is by controlling the outflow through the product as it is formed in the collection box 14. Increased air flow reduces the residual moisture in the product. As noted above, when the fiber product is formed, the forming fan 18 forces a stream of air through the fibers in the collection box 14 creating a mat of fibers 15. This air flow works to gather the fibers into the desired shape as they are formed and also forces residual water out of the product. In this embodiment, when the sensor 21 detects a moisture value in excess of the pre-set value, the control unit 22 relays a signal to the forming fans 18 causing them to increase their speed thereby drawing more air through the fibers 15. This, in turn, pulls more moisture out of the product.

It will be readily apparent to those skilled in the art that these different mechanisms can be combined to control the product moisture. For example, both the heat and air flow can be increased together to reduce product moisture. Similarly, the initial water added can be reduced and the air flow can be increased. Other combinations are readily apparent.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of controlling moisture in uncured formaldehyde-free binder coated glass fibers comprising:
   preparing an aqueous formaldehyde-free binder composition;
   applying the binder composition to glass fibers in a collection box;
   removing water from the coated fibers;
   measuring the moisture content of the coated fibers as they leave the collection box;
   comparing the measured moisture content with a pre-set moisture content value;
   adjusting the moisture of the binder composition such that the measured moisture content of the coated fibers equals the pre-set value wherein said pre-set value ranges from greater than 5 % to about 20 %.

2. The method of claim 1 wherein the moisture content of the coated fibers is measured using a specirographic technique.

3. The method of claim 2 wherein the spectrographic technique is either a radio frequency technique or a near infrared technique.

4. The method of claim 1 wherein the formaldehyde-free binder composition comprises a polycarboxy polymer.

* * * * *